72838

William C. Goodwin.

Cutter for Runners of Strawberry Plants.

PATENTED
DEC 31 1867

Witnesses:
Jerome B. Lucke
R. Fitzgerald

W. C. Goodwin

UNITED STATES PATENT OFFICE.

WILLIAM C. GOODWIN, OF HAMDEN, CONNECTICUT.

Letters Patent No. 72,838, dated December 31, 1867.

IMPROVED MACHINE FOR TRIMMING STRAWBERRY-VINES.

The Schedule referred to in these Letters Patent and making part of the same.

TO ALL WHOM IT MAY CONCERN:

Be it known that I, WILLIAM C. GOODWIN, of the town of Hamden, in the county of New Haven, and State of Connecticut, have invented a new and useful Improvement in Cutters for the Runners or Creeping Vines of Strawberry-Plants, &c.; and I do hereby declare that the following is a full, clear, and exact description of the construction, character, and operation of the same, reference being had to the accompanying drawings, which make part of this specification, in which—

My improvement consists in the use of a rotary or revolving cutting-blade, armed with a pinion, which pinion is worked by an internal gear-wheel within the periphery or web of the traction-wheel, which rolls upon the ground by means of the friction occasioned by pushing it forward, which rotary cutting-blade cuts against or in connection with the edge of a stationary or fixed blade, so that, both together, they will cut the runners or creeping vines of the strawberry-plants by a positive yet drawing cut after the fixed blade has raised the runners some distance from the ground, so as to insure a clean cut.

Figure 1:
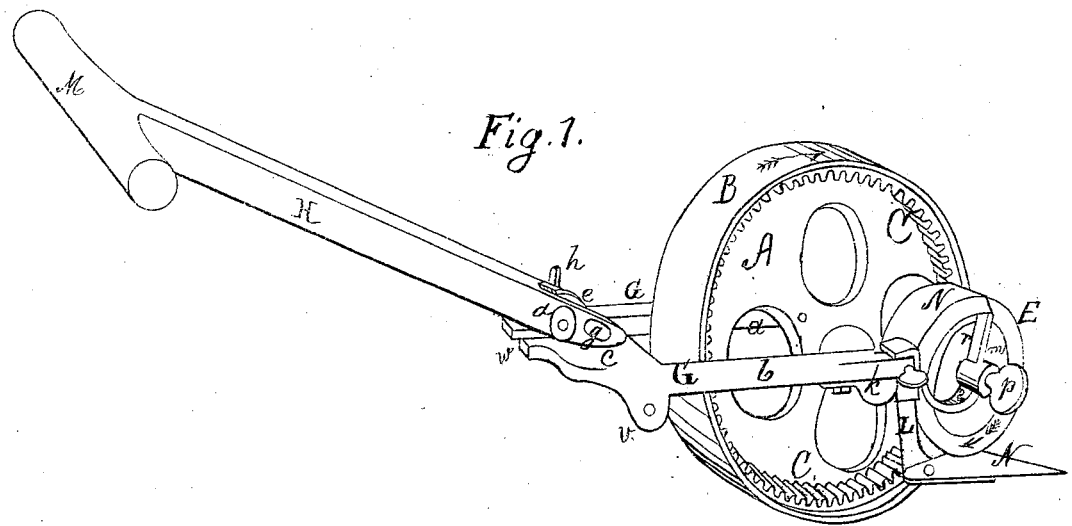
Figure 1 is a perspective view of the apparatus when ready for use.
Figure 2:
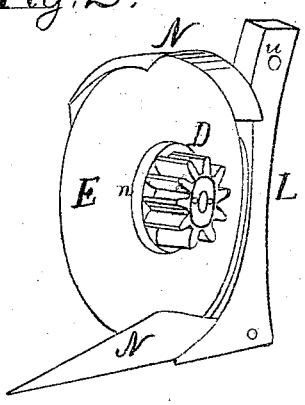
Figure 2 is a perspective view of the inner side of the two cutting-blades in their proper or relative positions, showing the pinion which operates the rotary cutting-blade by the action of the internal gear.

I make the traction-wheel A of cast iron or any other suitable material, of a convenient size, (say from twelve to eighteen inches in diameter,) with its tread or periphery smooth, as shown at B, fig. 1, (or it may be armed with suitable spurs, if deemed best, in any case;) and within its web I cast or fit an internal gear, as shown at C C, fig. 1, which serves to work the pinion shown at D, fig. 2, to give motion to the rotary cutting-blade E, figs. 1 and 2, to cut the runners or creeping vines of the strawberry-plants after they have been raised by the fixed blade.

I make the frame G G of cast iron, or any other suitable material, of two bars or shafts, as $a$ and $b$, and a cross or connecting-bar, $c$, all as shown in fig. 1; and to the cross-bar $c$ I attach a handle, as H, by means of a joint-pin, $d$, which handle I make adjustable, vertically, by means of a slot in the tongue $e$, in which the set-screw $g$ works, by which I secure the handle at the desired elevation by means of the nut $h$. Near the front end of each of the two bars $a$ and $b$ I attach a suitable bearing for the journal of the axis of the wheel A, as shown at $k$, by means of a screw, as shown at $l$, which works in a slot, so that I can adjust the wheel to the pinion D.

I make the pinion D of cast iron, or any other suitable material, with a suitable flange, as shown at $m$, fig. 1, and a shoulder, as shown at $n$, fig. 2, to receive and sustain the rotary cutting-blade C, and with which the blade turns. I suspend this pinion, with its appendages, on the plain or smooth barrel or shaft of the screw $p$, which I tap into the hub or enlargement at the junction of the braces $r$ and $s$, and, by having its extreme inner end press against an inside bearing, that is, within the pinion, or by using a washer against the outer side of the flange $m$, I am able to adjust the edge of the rotary cutting-blade to that of the fixed cutting-blade.

To the two outer ends of the braces $r$ and $s$ I cast or attach a segment of a circle, as shown at N, which serves, not only as a support for the ends of the braces, but also as a shield to protect the pinion D from dirt, &c., and as a guard for the upper portion of the edge or periphery of the rotary cutting-blade; and I cast on or connect with the braces and shield an arm, as shown at L, to which I secure the fixed cutting-blade K, as represented in figs. 1 and 2; and I secure the frame L $r$ $s$ N to the end of the bar $b$ by means of a screw, as represented at $t$, fig. 1, which I tap into the hole $u$, fig. 2, or I secure it by any other convenient means.

I make the rotary cutting-blade E of steel, with a properly-bevelled edge or periphery, either smooth or serrated, (to cut like shears,) and a hole in the centre to fit the shoulder $n$ of the pinion D, into which I secure it, as shown in fig. 2. This cutter may be made sickle-edged, if thought best.

I make the stationary or fixed blade K of steel, substantially of the shape shown in figs. 1 and 2, making its upper edge so much inclined that it will raise each runner or creeping vine entirely above the surface of the soil, and any gravel or small stones which may be mixed with it or rest upon it before the runner arrives at the edge of the rotary blade, by which it is to be severed or cut, so that there will not be anything to dull or injure the cutting-edges; and I secure this blade firmly to the lower part of the arm L, as represented in figs. 1 and 2.

Having made the several parts, and arranged and adjusted them, as before described, I take hold of the cross-bar M of the handle and elevate it till the extreme point of the fixed blade will work slightly below the surface of the ground, that is, so that it will pass under all of the runners of the strawberry-plants and then push the apparatus forward between the rows, when each of the runners will be elevated, by the edge of the fixed cutting-blade, entirely above the surface of the ground, and when it comes in contact with the edge of the rotary cutting-blade the runner will be cut smoothly, and without strain on the strawberry-plant.

Instead of making the wheel A with an internal gear, and using a pinion, as before described, a large pulley may be fitted within the web of the wheel A, and, instead of the pinion D, a small pulley may be secured to the disk and axis of the rotary cutting-blade E, and a belt used to revolve the rotary blade, but this mechanical equivalent I think but a poor substitute; and, instead of the frame G G being made with three bars, $a$, $b$, and $c$, it may be made of one bar, like $b$, and the wheel A may be revolved on a stud inserted into a slot for adjustment, instead of the bearings $k$; and the frame L $r$ $s$ N may be cast in one piece with the bar $b$, and so dispense with the screw $t$.

I have tried all of these variations, but much prefer the devices before particularly described, and set forth in the drawings, because therewith I have a positive motion for the rotary cutting-blade, and a better support for the axis of the wheel A; and it also enables me to transform it into a cultivator by simply detaching the frame L $r$ $s$ N, with the pinion and cutters, and attaching the blades of my cultivator to the frame G G by means of two ears, one of which is shown at $v$ and the space shown at $w$, so that I can use the same wheel, frame, and handle for either of the two instruments with equal convenience.

What I claim as my invention, and desire to secure by Letters Patent, is—

1. The combination of the rotary cutting-blade with the fixed cutting-blade, when constructed, arranged, and fitted for elevating and cutting the runners or creeping vines, substantially as herein described and set forth.

2. I claim the combination of the rotary cutting-blade with the pinion and internal gear, or their equivalent, when constructed, arranged, and the blade caused to rotate in the manner and for the purpose substantially as herein described and set forth.

W. C. GOODWIN.

Witnesses:
  JEROME B. LUCKE,
  R. FITZGERALD.